United States Patent
Sun et al.

(10) Patent No.: US 10,410,382 B2
(45) Date of Patent: Sep. 10, 2019

(54) RECONSTRUCTING IMAGE

(71) Applicant: Shenyang Neusoft Medical Systems Co., Ltd., Shenyang (CN)

(72) Inventors: Zhipeng Sun, Shenyang (CN); Shaolian Liu, Shenyang (CN); Ming Li, Shenyang (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 235 days.

(21) Appl. No.: 15/708,510

(22) Filed: Sep. 19, 2017

(65) Prior Publication Data

US 2018/0089862 A1 Mar. 29, 2018

(30) Foreign Application Priority Data

Sep. 23, 2016 (CN) .......................... 2016 1 0846567

(51) Int. Cl.
*G06K 9/00* (2006.01)
*G06T 11/00* (2006.01)
*G01T 1/29* (2006.01)

(52) U.S. Cl.
CPC .......... *G06T 11/003* (2013.01); *G01T 1/2985* (2013.01); *G06T 11/006* (2013.01); *G06T 2210/41* (2013.01); *G06T 2211/424* (2013.01)

(58) Field of Classification Search
None
See application file for complete search history.

(56) References Cited

U.S. PATENT DOCUMENTS

| 2014/0023993 A1* | 1/2014 | Zeng | G02B 21/0052 433/215 |
| 2014/0158890 A1* | 6/2014 | Pistorius | G01T 1/1647 250/362 |
| 2016/0070008 A1* | 3/2016 | Cao | A61B 6/4241 378/5 |

* cited by examiner

*Primary Examiner* — Stephen P Coleman
(74) *Attorney, Agent, or Firm* — Fish & Richardson P.C.

(57) ABSTRACT

Method, systems and machine-readable storage mediums for reconstructing images are provided. In one aspect, a method includes: acquiring data of a response line, the data including an actual energy parameter of each of photons in a photon pair corresponding to the response line, the actual energy parameter being detected by a detector and within a preset energy range, determining an energy factor of the response line according to the actual energy parameter of each of the photons in the photon pair and a theoretical energy parameter of the photon, obtaining a system parameter according to the energy factor, the system parameter including an element indicating a probability that a photon pair generated in a region of a subject corresponding to an image voxel is received by the detector, constructing a system response model with the system parameter, and reconstructing an image based on the system response model.

20 Claims, 3 Drawing Sheets

RECONSTRUCTING IMAGE

CROSS REFERENCE TO RELATED APPLICATIONS

The present disclosure claims priority under 35 U.S.C. § 119 to Chinese Patent Application No. 201610846567.X filed on Sep. 23, 2016, the entire content of which is incorporated herein by reference.

TECHNICAL FIELD

The present disclosure relates to image processing, particularly to image reconstructing.

BACKGROUND

Positron Emission Computed Tomography (PET) and PET-Computed Tomography (PET-CT) are the most advanced large-scale medical diagnostic imaging devices available today. The PET and the PET-CT may reconstruct an image of nuclide distribution by detecting a photon pair generated when a position annihilation event occurs. Data obtained from the detection may include false information, which may cause that the reconstructed image has a relatively large noise and a relatively low signal-to-noise ratio.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

The present disclosure provides methods, systems, and machine-readable storage mediums for image reconstructing, which can reduce noise in a reconstructed image and increase signal-to-noise ratio of the reconstructed image.

One innovative aspect of the subject matter described in the present disclosure can be embodied in methods that include the actions of acquiring data of a response line, the data of the response line including an actual energy parameter of each of photons in a photon pair corresponding to the response line, the actual energy parameter being detected by a detector and within a preset energy range; determining an energy factor of the response line according to the actual energy parameter of each of the photons in the photon pair and a theoretical energy parameter of the photon, the energy factor reflecting a degree that the actual energy parameter of each of the photons in the photon pair is close to the theoretical energy parameter; obtaining a system parameter according to the energy factor, the system parameter including an element indicating a probability that a photon pair generated in a region of a subject corresponding to an image voxel is received by the detector; constructing a system response model with the system parameter; and reconstructing an image based on the system response model.

Another innovative aspect of the subject matter features methods that include the actions of acquiring data of a response line, the data including a respective actual energy parameter of each of photons in a photon pair, the actual energy parameters of the photons in the photon pair being detected by a crystal pair in a detector, the response line corresponding to the crystal pair, each of the actual energy parameters being within a preset energy range; determining an energy factor of the response line according to the respective actual energy parameter of each of the photons in the photon pair and a theoretical energy parameter of the photon, the energy factor indicating a degree that the actual energy parameter of each of the photons in the photon pair is close to the theoretical energy parameter; obtaining a system parameter according to the energy factor, the system parameter including an element indicating a probability that the photon pair generated in a region of a subject is detected by the detector, the region of the subject corresponding to an image voxel of an image; constructing a system response model with the system parameter; and reconstructing the image based on the system response model.

Other embodiments of these aspects include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. For example, determining the energy factor can include: obtaining a first difference value between the theoretical energy parameter and the actual energy parameter of a first photon of the photon pair; obtaining a second difference value between the theoretical energy parameter and the actual energy parameter of a second photon of the photon pair; and determining the energy factor according to the first difference value and the second difference value, wherein the energy factor is negatively correlated with the first difference value and the second difference value.

In some examples, the energy factor is expressed by:

$$p_{energy} = \frac{1}{n_{evt}} \sum_{i_{evt}=1}^{n_{evt}} \exp\left[-\frac{[E_m - E_0(i_{evt})]^2 + [E_m - E_1(i_{evt})]^2}{\sigma^2}\right]$$

where $p_{energy}$ represents the energy factor of the response line, $n_{evt}$ is a number of coincidence events corresponding to the response line, $i_{evt}$ represents an i th coincidence event corresponding to the response line, $E_0(i_{evt})$ is the actual energy parameter of the first photon, $E_1(i_{evt})$ is the actual energy parameter of the second photon, $E_m$ is the theoretical energy parameter, and $\sigma$ is an empirical value positively correlated with an energy resolution.

The data of the response line can further include: a crystal normalization coefficient that is a correction value for efficiency consistency of the detector; a crystal blurring factor for correcting blur of image; an attenuation coefficient for correcting attenuation of each of the photons in the photon pair during a propagation process; and a geometric coefficient representing a spatial geometric relationship between the image voxel and the crystal pair corresponding to the response line. Obtaining the system parameter according to the energy factor can include obtaining the system parameter corresponding to the response line according to a product of the crystal normalization coefficient, the crystal blurring factor, the attenuation coefficient, the geometric coefficient and the energy factor.

In some implementations, the method further includes: obtaining an initial system parameter corresponding to the response line according to a product of the crystal normalization coefficient, the crystal blurring factor, the attenuation coefficient and the geometric coefficient. Constructing the system response model with the system parameter can include constructing the system response model with the initial system parameter and the system parameter. The system response model can be constructed by determining an expectation maximization based on a Poisson probability model.

In some examples, the preset energy range is expressed by $[E_m - n\% \ E_m, E_m + n\% \ E_m]$, where $E_m$ is the theoretical energy parameter and n % is a crystal energy resolution.

The details of one or more examples of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

BRIEF DESCRIPTION OF DRAWINGSFIG

DETAILED DESCRIPTION

An image reconstructing process may include: a particular amount of drug containing radionuclides may be injected in a subject or a phantom; radionuclides may have radioactive decay to generate positrons; when the positrons moving by a smaller distance, a positron annihilation event may occur and a pair of photons (e.g., a gamma photon pair) may be generated. A corresponding moving direction of each of photons in the photon pair may be approximately opposite. Each of photons in the photon pair may be hit on a respective crystal in a detector included in an imaging device such as PET or PET-CT. The crystal may convert a received photon signal into visible light, and a photodetector of the detector may then convert the visible light into an electrical signal, which can be used to detect positions of the respective crystals hit by each of photons in the photon pair. Then the image of nuclide distribution may be reconstructed according to data corresponding to a response line (hereinafter may be referred to as data of response line) between the crystals receiving the pair of photons. An electrical signal converted by a single photon may be referred to as a single event. An electronic circuit may set a time window of which width is about 6 to 10 nanoseconds, and a pair of single events recorded in the time window may be referred to as a coincidence event. A coincidence event may determine a respective response line. Data of the response line may be the smallest unit for reconstructing an image.

An iterative reconstructing method can be used to reconstruct an image because of its good effect and high spatial resolution. A basic principle of the iterative reconstructing method can be as follows: assuming that a tomography cross section is formed by an unknown system matrix, a formula having a set of unknown vectors is constructed from measured projection data, e.g., data of response lines, and the unknown vectors are determined by the formula. In an example, iterative reconstructing methods may include a Maximum Likelihood Expectation Maximization (MLEM) algorithm, an Ordered Sub-sets Expectation Maximization (OSEM), etc. In any iterative reconstructing algorithm, the system matrix is a key factor during an image reconstructing process.

The system matrix may be also referred to as a system response matrix, and reflect the contribution of a radionuclide ray to an image voxel. The system matrix may be a matrix of B*D size of which element is p(b,d), where d may represent a crystal pair receiving a photon pair in a detector, b may represent a voxel of a reconstructed image, and p(b,d) may represent a probability that a photon pair generated in the region of the subject corresponding to the voxel b is received and/or detected by the crystal pair d. A voxel may correspond to a region of the subject.

Each matrix element p(b,d) can have four impact factors: a crystal normalization coefficient $p_{detsens}$, a crystal blurring factor $p_{detblur}$, an attenuation coefficient $p_{attn}$, and a geometric coefficient $p_{geom}$ corresponding to the crystal pair d. The crystal normalization coefficient $p_{detsens}$ may be a correction value for efficiency consistency of the detector; the crystal blurring factor $p_{detblur}$ may be used to correct blur of image caused by an inherent physical property of a crystal, a positron free stroke and so on; the attenuation coefficient $p_{attn}$ may be used to correct attenuation of a photon during a propagation process; and the geometric coefficient $p_{geom}$ may represent a spatial geometric relationship between an image voxel and a crystal pair in the detector. The crystal pair corresponds to the response line.

The element p(b, d) may be obtained according to the crystal normalization coefficient $p_{detsens}$, the crystal blurring factor $p_{detblur}$, the attenuation coefficient $p_{attn}$, and the geometric coefficient $p_{geom}$ of the response line corresponding to the crystal pair d. For example, p(b,d) can be obtained by the following formula (1):

$$p(b,d) = p_{detsens} \cdot p_{detblur} \cdot p_{attn} \cdot p_{geom} \quad (1)$$

A reconstructed image may be obtained with the above system matrix. In some cases, the reconstructed image may have a relatively small signal-to-noise ratio.

In examples of the present disclosure, an energy factor of a response line may be included in the system matrix, thereby further increasing the signal-to-noise ratio of a reconstructed image. The energy factor can be described as follows.

Figure 1:
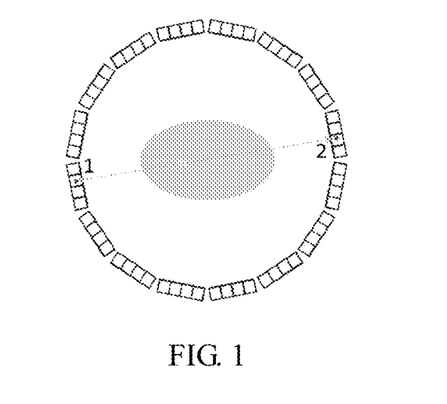
FIG. 1 is a schematic diagram of a true coincidence event according to one or more examples.

Each photon can have a fixed energy value at the beginning of generation, which is referred to as a theoretical energy parameter in the present disclosure. For example, for a gamma photon, the theoretical energy parameter is 511 KeV. FIG. 1 shows a schematic diagram of an ideally true coincidence event according to one or more examples. Each photon in a photon pair respectively reaches crystal 1 and crystal 2 in a detector along an opposite direction. A line connecting crystal 1 and crystal 2 passes through a position where a positron annihilation event occurs. The energy received by crystal 1 and crystal 2 may be slightly lower than (due to a loss of part of the energy of the photon in a flight process) or slightly higher than (there may be errors for the energy received by the crystals, for example, 511 KeV may be detected and/or recorded as 520 keV) the theoretical energy parameter. In some examples, the energy received by crystal 1 and crystal 2 may be within an energy range of $[E_m-n\% E_m, E_m+n\% E_m]$, where $E_m$ is a theoretical energy parameter, n % is a crystal energy resolution, and the crystal energy resolution n % can be preset or predetermined, e.g., based on empirical data or requirements. In a particular example, the crystal energy resolution is less than 25%. This coincidence event may be referred to as a true coincidence event.

Figure 2:
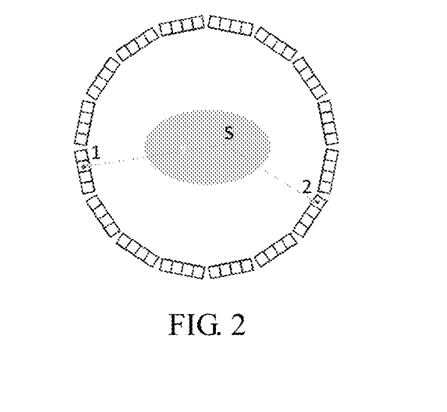
FIG. 2 is a schematic diagram of a false coincidence event according to one or more examples.

FIG. 2 shows a schematic diagram of a false coincidence event according to one or more examples. When photons fly in a subject, flight paths of a part of the photons may be changed, e.g., Compton scattering occurs. For example, in FIG. 2, since a flight path of one of the photons is changed at position S, it may cause that the line connecting the crystal 1 and the crystal 2 does not pass through the position where the positron annihilation event occurs. Thus, the response line formed by crystal 1 and crystal 2 may be a false response line. The energy of a photon, in which Compton scattering occurs, detected by the detector may be much smaller than its theoretical energy parameter. According to the energy characteristic, if energy of any photon detected by the detector is out of the energy range $[E_m-n\% E_m, E_m+n\% E_m]$, a response line corresponding to the photon can be filtered out. Using this method, most of the response lines in which Compton scattering occurs may be filtered out and not participated in the process of obtaining the system matrix. However, it is noted that although Compton scattering occurs in a small part of the response lines, the energy of its corresponding photon detected by the detector can fall within the above energy range, and thus such part of the response lines may still be taken into account in the process of obtaining the system matrix. If such part of response lines is taken into account in the process of obtaining the system matrix, it may cause that the reconstructed image has a relatively larger noise and a relatively lower signal-to-noise ratio.

Figure 3:
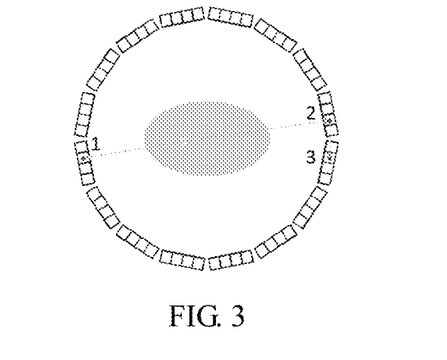
FIG. 3 is a schematic diagram of another false coincidence event according to other one or more examples.

Additionally, in a process a photon is received by a crystal in the detector, one or more response lines may be generated. FIG. 3 shows a schematic diagram of a false coincidence event according to another example. A gamma photon may interact with crystal 2 and crystal 3 successively. According to the energy range, response lines taken into account in the process of obtaining the system matrix may include response line 1-2 between crystal 1 and crystal 2, response line 1-3 between crystal 1 and crystal 3, or both of response line 1-2 and response line 1-3. However, if response line 1-3 is taken into account in the process of obtaining the system matrix, the reconstructed image may have a relatively larger noise.

The above two cases shown in FIG. 2 and FIG. 3 may be referred to as false coincidence events. To distinguish a true coincidence event from a false coincidence event, the present disclosure provides a method of reconstructing an image of which basic idea is as follows: a response line corresponding to a coincidence event is obtained, and then energy of each of photons in a photon pair on the response line is obtained; if the energy of each of the photons in the photon pair is closer to the theoretical energy parameter, it may be considered that reliability of the response line is relatively higher and contribution of the response line to a reconstructed image may be increased; if a difference between the energy of each of photons in the photon pair and the theoretical energy parameter is larger, it may be considered that the reliability of the response line is relatively lower and the contribution of the response line to the reconstructed image may be reduced. A signal-to-noise ratio of the reconstructed image may be increased with the above method. It is noted that energy of a photon or energy received by a crystal here refers to the energy detected by the detector when the photon hits on the crystal.

To provide a better understanding of the present disclosure by those skilled in the art, the technical solution disclosed in examples of the present disclosure will be described clearly and fully in conjunction with the accompanying drawings disclosed in examples of the present disclosure. It is obvious that the described examples are merely a part of examples disclosed by the present disclosure rather than all examples. Based on examples disclosed by present disclosure, all other examples acquired by those skilled in the art, without creative work, fall within the scope of protection of the present disclosure.

Figure 4:
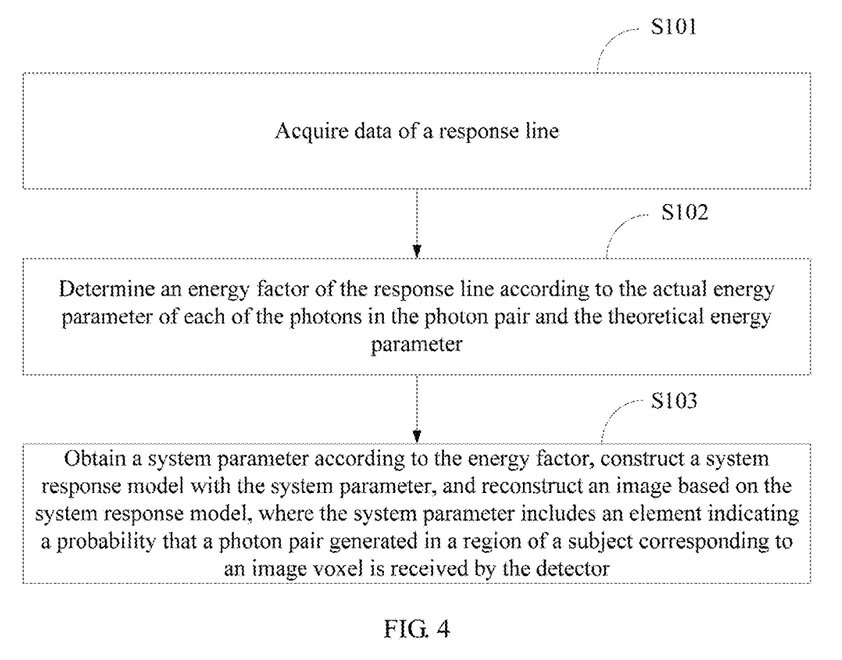
FIG. 4 is a flow diagram of a process illustrating a method of reconstructing an image according to one or more examples of the present disclosure.

FIG. 4 is a flow chart of a process illustrating a method of reconstructing an image according to one or more examples of the present disclosure. The process may include the following steps S101 to S103.

At step S101, data of a response line may be obtained.

The data of the response line can include an actual energy parameter of each of photons in a photon pair corresponding to the response line. The actual energy parameter may represent actual energy detected by the detector when any photon of the photon pair hits on a crystal in the detector. The actual energy parameter of each of the photons in the photon pair is within a preset energy range $[E_m-n\% E_m, E_m+n\% E_m]$. The preset energy range is a basic requirement for the photon pair to participate in the process of obtaining the system matrix. It is noted that the photon pair is not formed by any two photons, but formed by two photons generated by a same positron annihilation event.

At step S102, an energy factor of the response line may be determined according to the actual energy parameter of each of the photons in the photon pair and the theoretical energy parameter.

The energy factor may reflect a degree that the actual energy parameter is close to the theoretical energy parameter. If the actual energy parameter is closer to the theoretical energy parameter, it indicates that a coincidence event corresponding to the response line is more likely to be a true coincidence event. If a difference between the actual energy parameter and the theoretical energy parameter is greater, it indicates that the coincidence event corresponding to the response line is more likely to be a false coincidence event.

In some examples, the photon pair includes a first photon and a second photon. A first difference value between the theoretical energy parameter and the actual energy parameter of the first photon may be obtained. A second difference value between the theoretical energy parameter and the actual energy parameter of the second photon may be obtained. The energy factor corresponding to the response line may be determined according to the first difference value and the second difference value. The energy factor may be negatively correlated with the first difference value and the second difference value. In an example, the larger the first difference value and the second difference value are, the smaller the energy factor is, so as to reduce the contribution of the response line to the reconstructed image; the smaller the first difference value and the second difference value are, the larger the energy factor is, so as to increase the contribution of the response line to the reconstructed image. By distinguishing the contribution of different response lines to the reconstructed image, noise of the reconstructed image may be effectively reduced, thus improving a signal-to-noise ratio of the reconstructed image.

In the present example, the energy factor may be expressed by formula (2) as follows:

$$p_{energy} = \frac{1}{n_{evt}} \sum_{i_{evt}=1}^{n_{evt}} \exp\left[-\frac{[E_m - E_0(i_{evt})]^2 + [E_m - E_1(i_{evt})]^2}{\sigma^2}\right]. \quad (2)$$

Here $p_{energy}$ may represent the energy factor of the response line, $n_{evt}$ may be a number of coincidence events corresponding to the response line, $i_{evt}$ may represent an i th coincidence event corresponding to the response line, $E_0(i_{evt})$ may be the actual energy parameter of the first photon, $E_1(i_{evt})$ may be the actual energy parameter of the second photon, $E_m$ may be the theoretical energy parameter that is the same for the first photon and the second photon, and $\sigma$ may be an empirical value and positively correlated with an energy resolution.

It is noted that a coincidence event corresponding to a response line may refer to a coincidence event satisfying a condition that the actual energy parameter of each of photons in a photon pair on the response line is within the preset energy range.

For example, it is assumed that the number of coincidence events corresponding to the response line is 3, and the coincidence events include a first coincidence event, a second coincidence event and a third coincidence event. The actual energy parameter $E_0(1)$ of the first photon in the first coincidence event is 500 KeV, and the actual energy parameter $E_1(1)$ of the second photon in the first coincidence event is 479 KeV; the actual energy parameter $E_0(2)$ of the first photon in the second coincidence event is 505 KeV, the actual energy parameter $E_1(2)$ of the second photon in the second coincidence event is 501 KeV; the actual energy parameter $E_0(3)$ of the first photon in the third coincidence event is 491 KeV, and the actual energy parameter $E_1(3)$ of the second photon in the third coincidence event is 465 KeV; the theoretical energy parameter $E_m$ is 511 KeV; and $\sigma$ is 20. According to the above formula (2) of the energy factor, the energy factor may be determined as follows:

$$p_{energy} = \frac{1}{3}\left\{\exp\left[-\frac{[511-500]^2 + [511-479]^2}{20^2}\right] + \right.$$

$$\exp\left[-\frac{[511-505]^2 + [511-501]^2}{20^2}\right] +$$

-continued $$\left.\exp\left[-\frac{[511-491]^2 + [511-465]^2}{20^2}\right]\right\} \approx 0.26$$

It is noted that, a method of determining an energy factor provided by the present disclosure does not constitute a limitation of the present disclosure, and according to a thought of determining an energy factor provided by the present disclosure, other determining methods obtained by those skilled in the art are also within the scope of the present disclosure.

At step S103, a system parameter may be obtained according to the energy factor, a system response model may be constructed with the system parameter, and an image may be then reconstructed based on the system response model, where the system parameter includes an element indicating a probability that a photon pair generated in a region of a subject corresponding to an image voxel is received by the detector.

In the present disclosure, the system parameter may be the system matrix. After obtaining the energy factor, the energy factor may be multiplied by other impact factors as noted above to obtain the element $p_E(b,d)$ of the system matrix. The element $p_E(b,d)$ may be expressed by formula (3) as follows:

$$p_E(b, d) = p_{detsens} \cdot p_{detblur} \cdot p_{atm} \cdot p_{geom} \cdot p_{energy} \quad (3).$$

In the present disclosure, by adding an energy factor to the system matrix, contribution of a response line on which a coincidence event is a true coincidence event with a higher probability to the reconstructed image may be increased, and contribution of the response line on which the coincidence event is a true coincidence event with a lower probability to the reconstructed image may be reduced. In this way, noise of the reconstructed image may be reduced and the signal-to-noise ratio of the reconstructed image may be improved.

In some examples, an iterative reconstructing method may be based on a method of determining an Expectation Maximization (EM) of a Poisson probability model. A likelihood function may be expressed by formula (4) as follows:

$$L(\lambda) = \prod_{\substack{b=1,\ldots,B \\ d=1,\ldots,D}} e^{-\lambda(b,d)} \frac{\lambda(b, d)^{n(b,d)}}{n(b, d)!}. \quad (4)$$

The method of determining an EM can be used in the likelihood function in a way that the iterative formula (5) (e.g., the system response model) of the iterative reconstructing method may be obtained. The iterative formula (5) is expressed as follows:

$$\lambda^{[k+1]}(b) = \frac{\lambda^{[k]}(b)}{\sum_{d=1}^{D} p(b, d)} \sum_{d=1}^{D} \frac{n^*(d) p_E(b, d)}{\sum_{b'=1}^{B} \lambda^{[k]}(b') p(b', d)}. \quad (5)$$

Here, $\lambda$ may represent an image to be reconstructed, $\lambda^{[k]}(b)$ may represent a total number of photon pairs generated in the voxel b in the k-th iteration, $\lambda^{[k+1]}(b)$ may represent a total number of photon pairs generated in the voxel b in the (k+1)-th iteration, B may represent a total number of the voxels, $n^*(d)$ may represent a number of coincidence events on a crystal pair d, D may represent a number of the crystal pairs, the element p(b',d) of the system matrix may represent a probability that the photon pair generated in a region of a subject corresponding to the b'-th voxel is detected by the detector, b' may represent a sequence number of a voxel, which is an integer greater than or equal to 1 and less than or equal to B, p(b,d) may be an element of a system matrix (i.e., an initial system parameter) that does not take the energy factor into account, and $P_E(b,d)$ may be an element of the system matrix that takes the energy factor into account. The system response model is constructed by determining an expectation maximization based on the Poisson probability model.

Further, a local smoothing term may be added to the above iterative formula (5) to control a degree of smoothness of a reconstructed image by adjusting values of β and δ in the smoothing term. Smoothing the reconstructed image may result in that a large area, a low frequency component, a trunk part of the reconstructed image is emphasized, noise of the reconstructed image is suppressed, and high frequency components of the reconstructed image are interfered. In this way, brightness of the reconstructed image may be gently and gradually changed and a mutation gradient may be reduced.

In some examples, a likelihood function including the smoothing term may be expressed by the formula (6) as follow:

$$L'(\lambda) = \exp[-\beta V(\lambda)] \prod_{\substack{b=1,\ldots,B \\ d=1,\ldots,D}} e^{-\lambda(b,d)} \frac{\lambda(b,d)^{n(b,d)}}{n(b,d)!}. \quad (6)$$

The method of determining an EM can be used in the likelihood function in a way that the iterative formula (7) can be obtained. The iterative formula (7) including the smoothing term may be represented as follows:

$$\lambda^{[k+1]}(b) = \frac{\lambda^{[k]}(b)}{\sum_{d=1}^{D} p(b,d) + \beta \frac{\delta}{\delta \lambda} V(\lambda)\Big|_{\lambda^{[k]}}} \sum_{d=1}^{D} \frac{n^*(d) p_E(b,d)}{\sum_{b'=1}^{B} \lambda^{[k]}(b') p(b',d)}, \quad (7)$$

where β may refer to an empirical value for a weight which is used to balance the smoothing term and the likelihood function, δ is a symbol for determining a partial derivative, V(λ) is a smoothing function whose value is smaller as the reconstructed image is smoother.

Based on the method of reconstructing an image provided by the above examples, examples of the present disclosure further provide an apparatus for reconstructing an image, which will be described in detail with reference to the accompanying drawings.

Figure 5:
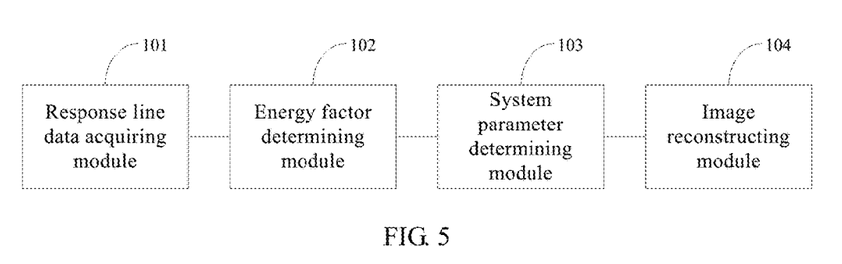
FIG. 5 is a block diagram of an apparatus for reconstructing an image according to one or more examples of the present disclosure.

FIG. 5 is a block diagram of an apparatus for reconstructing an image according to one or more examples of the present disclosure.

The apparatus for reconstructing an image provided by the present disclosure includes a response line data acquiring module 101, an energy factor determining module 102, a system parameter determining module 103 and an image reconstructing module 104.

Herein the response line data acquiring module 101 may be configured to acquire data of a response line, where the data of the response line includes an actual energy parameter of each of photons in a photon pair corresponding to the response line, and the actual energy parameter is within a preset energy range.

The energy factor determining module 102 may be configured to determine an energy factor of the response line according to the actual energy parameter of each of the photons in the photon pair and a theoretical energy parameter, where the energy factor reflects a degree that the actual energy parameter of each of the photons in the photon pair is close to the theoretical energy parameter.

The system parameter determining module 103 may be configured to obtain a system parameter according to the energy factor, where the system parameter includes an element indicating a probability that a photon pair generated in a region of a subject corresponding to an image voxel is received by the detector.

The image reconstructing module 104 may be configured to construct a system response model with the system parameter and reconstruct an image based on the system response model.

In the present disclosure, by adding an energy factor to the system matrix, contribution of a response line on which a coincidence event is a true coincidence event with a higher probability to the reconstructed image may be increased, and contribution of the response line on which the coincidence event is a true coincidence event with a lower probability to the reconstructed image may be reduced. In this way, noise of the reconstructed image may be reduced and the signal-to-noise ratio of the reconstructed image may be improved.

In some examples, the energy factor determining module 102 may be further configured to obtain a first difference value between the theoretical energy parameter and the actual energy parameter of a first photon of the photon pair; obtain a second difference value between the theoretical energy parameter and the actual energy parameter of a second photon of the photon pair; and determine the energy factor according to the first difference value and the second difference value, where the energy factor is negatively correlated with the first difference value and the second difference value. The energy factor can be expressed by the above formula (2).

In some examples, the data of the response line further includes a crystal normalization coefficient, a crystal blurring factor, an attenuation coefficient and a geometric coefficient corresponding to the response line. The crystal normalization coefficient is a correction value for the efficiency consistency of the detector. The crystal blurring factor is used to correct blur of image caused by inherent physical properties of a crystal, positron free stroke and so on. The attenuation coefficient is used to correct attenuation of each of the photons in the photon pair during a propagation process. The geometric coefficient represents a spatial geometric relationship between an image voxel and a crystal pair in the detector corresponding to the response line.

The system parameter determining module 103 is further configured to obtain the system parameter corresponding to the response line according to a product of the crystal normalization coefficient, the crystal blurring factor, the attenuation coefficient, the geometric coefficient and the energy factor.

Figure 6:
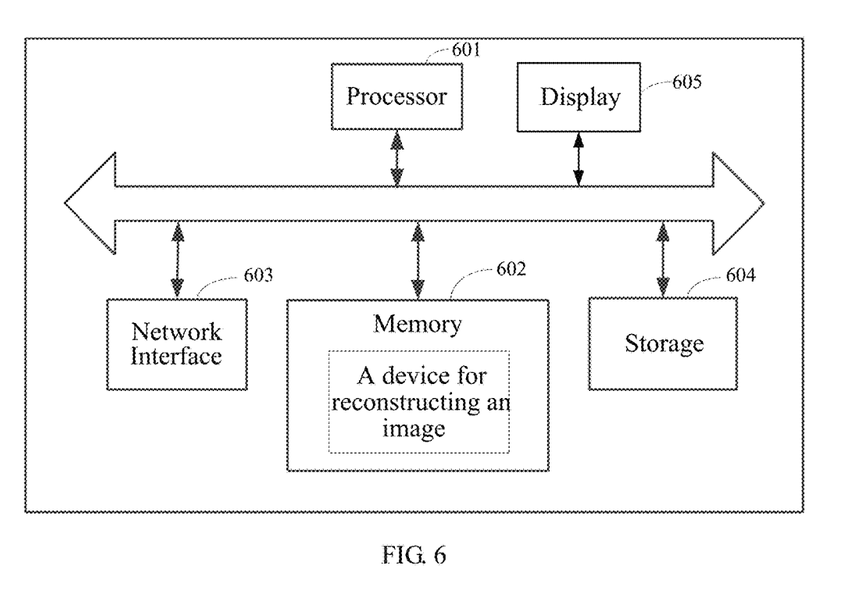
FIG. 6 is a hardware structural diagram of a system for reconstructing an image according to one or more examples of the present disclosure.

The above apparatus for reconstructing an image may be applied to a device in a projection system or any electronic device with a processor, such as an image processor. The electronic device may be any existing electronic device or any electronic device that is being developed or to be developed, including but not limited to: existing desktop computers, laptops, mobile terminals (including smart phones, non-smart phones, all kinds of tablet computers) etc., or those that is being developed or to be developed. The apparatus example may be implemented by software, or may be implemented by hardware or a combination of hardware and software. Taking software implementation as an example, through the device in the projection system or the processor in the electronic device, a logical apparatus may be formed by reading the corresponding computer program instructions in a storage to a memory. From the hardware level, as shown in FIG. 6, it is a hardware structural diagram of a device in a projection system or an electronic device with a processor at which an apparatus for reconstructing an image is located according to one or more examples in the present disclosure. In addition to the processor 601, the memory 602, the network interface 603, and the storage 604 as shown in FIG. 6, the device in the projection system or the electronic device with the processor at which the apparatus for reconstructing an image is located may further include other hardware, such as a display 605, depending on the actual function of the apparatus, and further detail is omitted for brevity.

Here logic instructions corresponding to a method of reconstructing an image may be stored in the storage. The storage may be, for example, a non-volatile memory. The processor may invoke the logical instructions stored in the storage to execute the above method of reconstructing an image. The display may display the reconstructed image.

If the function of the logical instructions corresponding to the method of reconstructing an image is implemented in a form of a software functional module and is sold or used as a standalone product, it may be stored in a machine readable storage medium. Based on this understanding, the technical solution of the present disclosure, either essentially or for the part contributing to the prior art or for the part of the technical solution, may be embodied in a form of a software product. The software product may be stored in a storage medium, including several instructions to enable a computer device (which may be a personal computer, a server, or a network device, etc.) to execute all or part of the blocks of the method described in above examples. The above storage medium includes any media on which program codes may be stored, such as a USB disk, a mobile hard disk, a Read-Only Memory (ROM), a Random Access Memory (RAM), a magnetic disk, an optical disk, or the like.

A system for reconstructing an image may be provided in the present disclosure. The system includes: one or more processors and a non-transitory machine readable storage medium storing machine executable instructions.

The processors are caused by the machine executable instructions to: acquire data of a response line, where the data of the response line includes an actual energy parameter of each of photons in a photon pair corresponding to the response line, and the actual energy parameter is within a preset energy range; determine an energy factor of the response line according to the actual energy parameter of each of the photons in the photon pair and a theoretical energy parameter, where the energy factor reflects a degree that the actual energy parameter of each of the photons in the photon pair is close to the theoretical energy parameter; obtain a system parameter according to the energy factor, where the system parameter includes an element indicating a probability of a photon pair generated in a region of a subject corresponding to an image voxel being received by the detector; construct a system response model with the system parameter; and reconstruct an image based on the system response model.

In an example, the processors are further caused by the machine executable instructions to: obtain a first difference value between the theoretical energy parameter and the actual energy parameter of a first photon of the photon pair; obtain a second difference value between the theoretical energy parameter and the actual energy parameter of a second photon of the photon pair; and determine the energy factor according to the first difference value and the second difference value, where the energy factor is negatively correlated with the first difference value and the second difference value.

In an example, the energy factor is expressed by the above formula (2).

In an example, the data of the response line further includes: a crystal normalization coefficient, which is a correction value for efficiency consistency of the detector; a crystal blurring factor to correct blur of image; an attenuation coefficient to correct attenuation of each of the photons in the photon pair during a propagation process; and a geometric coefficient to represent a spatial geometric relationship between an image voxel and a crystal pair in the detector corresponding to the response line. When obtaining the system parameter according to the energy factor, the processors are further caused by the machine executable instructions to obtain the system parameter corresponding to the response line according to a product of the crystal normalization coefficient, the crystal blurring factor, the attenuation coefficient, the geometric coefficient and the energy factor.

In an example, the processors are further caused by the machine executable instructions to obtain an initial system parameter corresponding to the response line according to a product of the crystal normalization coefficient, the crystal blurring factor, the attenuation coefficient and the geometric coefficient. When constructing the system response model with the system parameter, the processors are further caused by the machine executable instructions to construct the system response model with the initial system parameter and the system parameter.

In an example, the system response model is constructed by determining an expectation maximization based on a Poisson probability model.

The system for reconstructing an image may include a display for displaying the reconstructed image.

When referring to elements of examples of the present disclosure, the articles such as "a", "one", "this" and "the" are intended to indicate one or more elements. The words such as "include", "contain" and "have" are inclusive and mean the presence of other elements besides the elements listed.

The foregoing description is merely a detailed description of the present disclosure. It should be noted that several improvements and modifications may be made by those skilled in the art without departing from the principles of the present disclosure and that such improvements and modifications should also be regarded as the scope of protection of the present disclosure.

The invention claimed is:

1. A method of reconstructing images, comprising:
  acquiring data of a response line, the data including a respective actual energy parameter of each of photons in a photon pair, the actual energy parameters of the photons in the photon pair being detected by a crystal pair in a detector, the response line corresponding to the crystal pair, each of the actual energy parameters being within a preset energy range;

determining an energy factor of the response line according to the respective actual energy parameter of each of the photons in the photon pair and a theoretical energy parameter of the photon, the energy factor indicating a degree that the actual energy parameter of each of the photons in the photon pair is close to the theoretical energy parameter;

obtaining a system parameter according to the energy factor, the system parameter including an element indicating a probability that the photon pair generated in a region of a subject is detected by the detector, the region of the subject corresponding to an image voxel of an image;

constructing a system response model with the system parameter; and reconstructing the image based on the system response model.

2. The method according to claim 1, wherein the preset energy range is expressed by $$[E_m-n\% \ E_m, E_m+n\% \ E_m],$$

where $E_m$ is the theoretical energy parameter and n % is a crystal energy resolution.

3. The method according to claim 1, wherein determining the energy factor comprises:

obtaining a first difference value between the theoretical energy parameter and the actual energy parameter of a first photon of the photon pair;

obtaining a second difference value between the theoretical energy parameter and the actual energy parameter of a second photon of the photon pair; and determining the energy factor according to the first difference value and the second difference value, wherein the energy factor is negatively correlated with the first difference value and the second difference value.

4. The method according to claim 3, wherein the energy factor is expressed by:

$$p_{energy} = \frac{1}{n_{evt}} \sum_{i_{evt}=1}^{n_{evt}} \exp\left[-\frac{[E_m - E_0(i_{evt})]^2 + [E_m - E_1(i_{evt})]^2}{\sigma^2}\right]$$

where $p_{energy}$ represents the energy factor of the response line, $n_{evt}$ is a number of coincidence events corresponding to the response line, $i_{evt}$ represents an i th coincidence event corresponding to the response line, $E_0(i_{evt})$ is the actual energy parameter of the first photon, $E_1(i_{evt})$ is the actual energy parameter of the second photon, $E_m$ is the theoretical energy parameter, and σ is an empirical value positively correlated with an energy resolution.

5. The method according to claim 1, wherein the data of the response line further comprises:

a crystal normalization coefficient that is a correction value for efficiency consistency of the detector;

a crystal blurring factor for correcting blur of image;

an attenuation coefficient for correcting attenuation of each of the photons in the photon pair during a propagation process; and a geometric coefficient representing a spatial geometric relationship between the image voxel and the crystal pair corresponding to the response line, and wherein obtaining the system parameter according to the energy factor comprises:

obtaining the system parameter corresponding to the response line according to a product of the crystal normalization coefficient, the crystal blurring factor, the attenuation coefficient, the geometric coefficient and the energy factor.

6. The method according to claim 5, further comprising:

obtaining an initial system parameter corresponding to the response line according to a product of the crystal normalization coefficient, the crystal blurring factor, the attenuation coefficient and the geometric coefficient, wherein constructing the system response model with the system parameter comprises:

constructing the system response model with the initial system parameter and the system parameter.

7. The method according to claim 6, wherein the system response model is constructed by determining an expectation maximization based on a Poisson probability model.

8. A system for reconstructing an image, comprising:

one or more processors; and a non-transitory machine readable storage medium storing machine executable instructions, the processors are caused by the machine executable instructions to:

acquire data of a response line, the data including a respective actual energy parameter of each of photons in a photon pair corresponding to the response line, the respective actual energy parameter being detected by a detector and within a preset energy range;

determine an energy factor of the response line according to the actual energy parameter of each of the photons in the photon pair and a theoretical energy parameter of the photon, wherein the energy factor reflects a degree that the actual energy parameter of each of the photons in the photon pair is close to the theoretical energy parameter;

obtain a system parameter according to the energy factor, wherein the system parameter comprises an element indicating a probability that a photon pair generated in a region of a subject corresponding to an image voxel is received by the detector;

construct a system response model with the system parameter; and reconstruct an image based on the system response model.

9. The system according to claim 8, wherein the preset energy range is expressed by $$[E_m-n\% \ E_m, E_m+n\% \ E_m],$$

where $E_m$ is the theoretical energy parameter and n % is a crystal energy resolution.

10. The system according to claim 8, wherein the processors are caused by the machine executable instructions to:

obtain a first difference value between the theoretical energy parameter and the actual energy parameter of a first photon of the photon pair;

obtain a second difference value between the theoretical energy parameter and the actual energy parameter of a second photon of the photon pair; and determine the energy factor according to the first difference value and the second difference value, wherein the energy factor is negatively correlated with the first difference value and the second difference value.

11. The system according to claim 10, wherein the energy factor is expressed by $$p_{energy} = \frac{1}{n_{evt}} \sum_{i_{evt}=1}^{n_{evt}} \exp\left[-\frac{[E_m - E_0(i_{evt})]^2 + [E_m - E_1(i_{evt})]^2}{\sigma^2}\right]$$

where $p_{energy}$ represents the energy factor of the response line, $n_{evt}$ is a number of coincidence events corresponding to the response line, $i_{evt}$ represents an i th coincidence event corresponding to the response line, $E_0(i_{evt})$ is the actual energy parameter of the first photon, $E_1(i_{evt})$ is the actual energy parameter of the second photon, $E_m$ is the theoretical energy parameter, and $\sigma$ is an empirical value positively correlated with an energy resolution.

12. The system according to claim 8, wherein the data of the response line further comprises:
a crystal normalization coefficient that is a correction value for efficiency consistency of the detector;
a crystal blurring factor to correct blur of image;
an attenuation coefficient to correct attenuation of each of the photons in the photon pair during a propagation process; and
a geometric coefficient to represent a spatial geometric relationship between the image voxel and a crystal pair that is in the detector and corresponds to the response line;
when obtaining the system parameter according to the energy factor, the processors are caused by the machine executable instructions to:
obtain the system parameter corresponding to the response line according to a product of the crystal normalization coefficient, the crystal blurring factor, the attenuation coefficient, the geometric coefficient and the energy factor.

13. The system according to claim 12, wherein the processors are further caused by the machine executable instructions to:
obtain an initial system parameter corresponding to the response line according to a product of the crystal normalization coefficient, the crystal blurring factor, the attenuation coefficient and the geometric coefficient; and
when constructing the system response model with the system parameter, the processors are further caused by the machine executable instructions to:
construct the system response model with the initial system parameter and the system parameter.

14. The system according to claim 13, wherein the system response model is constructed by determining an expectation maximization based on a Poisson probability model.

15. A non-transitory machine-readable storage medium storing instructions executable by one or more processors and upon such execution cause the one or more processors to perform operations comprising:
acquiring data of a response line, wherein the data of the response line comprises an actual energy parameter of each of photons in a photon pair corresponding to the response line, and the actual energy parameter is detected by the detector and within a preset energy range;

determining an energy factor of the response line according to the actual energy parameter of each of the photons in the photon pair and a theoretical energy parameter of the photon, wherein the energy factor reflects a degree that the actual energy parameter of each of the photons in the photon pair is close to the theoretical energy parameter;
obtaining a system parameter according to the energy factor, wherein the system parameter comprises an element indicating a probability that a photon pair generated in a region of a subject corresponding to an image voxel is received by the detector;
constructing a system response model with the system parameter; and
reconstructing an image based on the system response model.

16. The storage medium according to claim 15, wherein the preset energy range is expressed by

[$E_m$-n % $E_m$, $E_m$+n % $E_m$], where $E_m$ is a theoretical energy parameter and n % is a crystal energy resolution.

17. The storage medium according to claim 15, wherein the operations further comprise:
obtaining a first difference value between the theoretical energy parameter and the actual energy parameter of a first photon of the photon pair;
obtaining a second difference value between the theoretical energy parameter and the actual energy parameter of a second photon of the photon pair; and
determining the energy factor according to the first difference value and the second difference value, wherein the energy factor is negatively correlated with the first difference value and the second difference value.

18. The storage medium according to claim 17, wherein the energy factor is expressed by $$p_{energy} = \frac{1}{n_{evt}} \sum_{i_{evt}=1}^{n_{evt}} \exp\left[-\frac{[E_m - E_0(i_{evt})]^2 + [E_m - E_1(i_{evt})]^2}{\sigma^2}\right]$$

wherein $p_{energy}$ represents the energy factor of the response line, $n_{evt}$ is a number of coincidence events corresponding to the response line, $i_{evt}$ represents an i th coincidence event corresponding to the response line, $E_0(i_{evt})$ is the actual energy parameter of the first photon, $E_1(i_{evt})$ is the actual energy parameter of the second photon, $E_m$ is the theoretical energy parameter, $\sigma$ is an empirical value positively correlated with an energy resolution.

19. The storage medium according to claim 15, wherein the data of the response line further comprises:
a crystal normalization coefficient that is a correction value for efficiency consistency of the detector;
a crystal blurring factor for correcting blur of image;
an attenuation coefficient for correcting attenuation of each of the photons in the photon pair during a propagation process; and
a geometric coefficient representing a spatial geometric relationship between the image voxel and a crystal pair that is in the detector and corresponds to the response line;

wherein obtaining the system parameter according to the energy factor comprises:

obtaining the system parameter corresponding to the response line according to a product of the crystal normalization coefficient, the crystal blurring factor, the attenuation coefficient, the geometric coefficient and the energy factor.

20. The storage medium according to claim 19, wherein the operations further comprise:

obtaining an initial system parameter corresponding to the response line according to a product of the crystal normalization coefficient, the crystal blurring factor, the attenuation coefficient and the geometric coefficient; and wherein constructing the system response model with the system parameter comprises:

constructing the system response model with the initial system parameter and the system parameter.

\* \* \* \* \*